March 26, 1929. H. J. LEIGHTON 1,706,791
METHOD OF PROVIDING SO-CALLED GEAR BLANKS WITH INTERNAL CLUTCH FACES
Filed Feb. 29, 1924 2 Sheets-Sheet 1
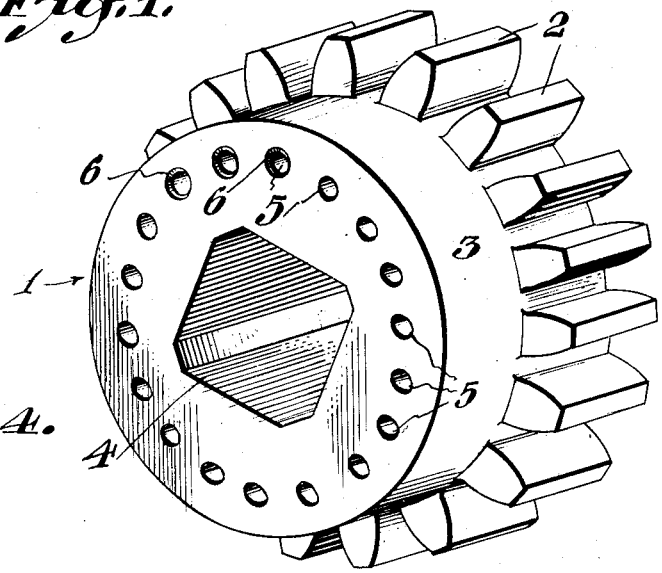
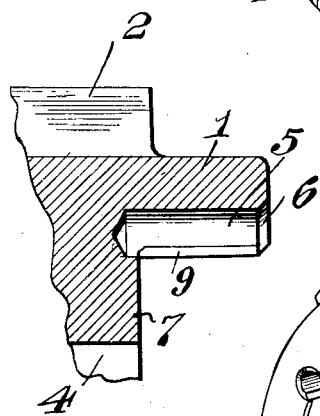
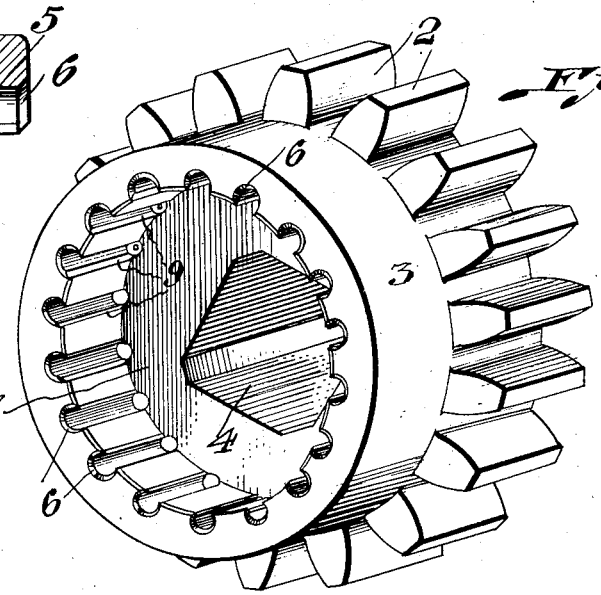
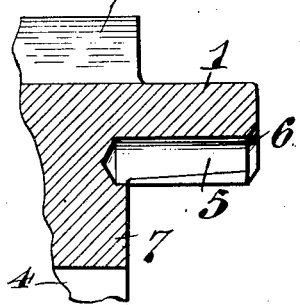
Inventor
Herbert J. Leighton
By Parsons & Bodell
Attorneys

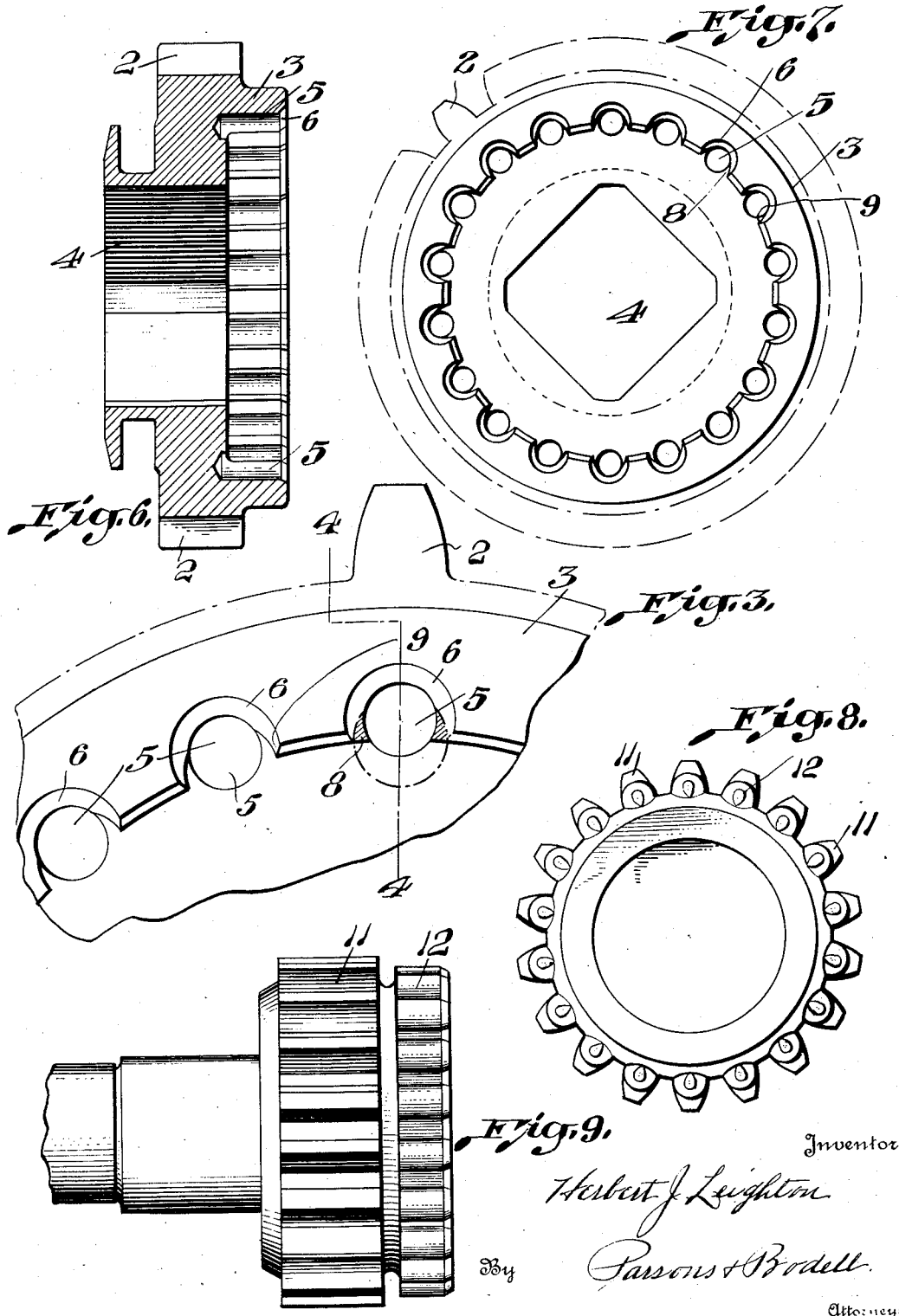

Patented Mar. 26, 1929.

1,706,791

UNITED STATES PATENT OFFICE.

HERBERT J. LEIGHTON, OF SYRACUSE, NEW YORK, ASSIGNOR TO THE BROWN-LIPE GEAR COMPANY, OF SYRACUSE, NEW YORK, A CORPORATION OF NEW YORK.

METHOD OF PROVIDING SO-CALLED GEAR BLANKS WITH INTERNAL CLUTCH FACES.

Application filed February 29, 1924. Serial No. 696,079.

This invention has for its object a method of providing so-called gear blanks with internal clutch faces and particularly providing the clutch face with surfaces for engaging the male member of the clutch, which surfaces extend as accurately as possible in parallel relation to the axis of the blank whereby the male and female clutch members are readily engaged and there is no appreciable looseness, chatter or lost motion between the clutch members. The method consists in the steps hereinafter set forth and claimed.

In describing this invention, reference is had to the accompanying drawings in which like characters designate corresponding parts in all the views.

Figure 1 is a perspective view of a gear blank showing the same as provided with a circular series of holes.

Figure 2 is a view similar to Fig. 1 showing the blank as counterbored with the bore intersecting the series of holes.

Figure 3 is an enlarged fragmentary face view of the blank showing some of the holes milled out and one not milled out.

Figures 4 and 5 are enlarged sectional views on line 4—5 Fig. 3.

Figure 6 is a sectional view of a completed blank.

Figure 7 is a face view of the completed blank shown in Fig. 6.

Figure 8 is an end view of the male member of the clutch which coacts with the clutch section shown in Fig. 6.

Fig. 9 is an elevation partly broken away of the male member of the clutch shown in Fig. 8.

Throughout the specification and claims, the blank is referred to as a gear blank and, although the blank here shown is provided with a gear wheel, it will be understood that the article need not have a gear, gear teeth, or a gear wheel associated therewith, and that the term " gear blank " is merely used for convenience, as, in use, the article is primarily a gear formed with a clutch face.

The gear blank so-called is formed generally with a suitable internal or axial opening which in the blank here shown is square.

This method of providing a so-called gear or clutch blank with an internal or female clutch face comprises providing the blank with a circular series of substantially parallel holes, in a circle concentric with the axis of the blank, these holes being preferably spaced equidistantly apart, counterboring the blank concentric with the axis of the blank and the circular series of holes leaving the inner sides of the holes opening into the bore throughout the depth of the bore, and truing, as accurately as possible with respect to the axis of the blank or in parallel relation to planes radial with the axis of the blank, the side walls of the holes adjacent the corners formed by said side walls and the wall of the bore. The counterbore preferably intersects the circular series of holes in a circle located within and concentric with the circle intersecting the centers of such holes.

Preferably, before the counterboring operation, the holes are provided with conical countersinks at their outer ends.

As drills seek the path of least resistance and, as they are free at their drilling or cutting ends, they tend, more or less, to shift from a position exactly parallel with the axis of the blank or in the words of the mechanic the drills "run off." However, in clutches, in order to obtain an accurate sliding fit with the male member of the clutch, the side faces of these holes, especially adjacent the corners formed by the side walls of the holes and the wall of the counterbore must be as accurately as possible in parallel relation to the axis of the blank or planes radial with such axis.

The truing of these side faces consists in simultaneously milling off the opposite walls of each hole adjacent the corners formed by such walls and the wall of the bore by an end mill engaging such walls adjacent the corners. As the end mill cuts at its end and being accurately indexed by suitable index mechanism and as, in this operation, it is removing comparatively little metal, it does not " run off " so that the faces cut thereby are concentric with the axis of the end mill and are in substantially accurate parallel relation with the axis of the blank or planes radial with such axis.

1 designates the blank, which is shown as a gear blank, for the reason that it is provided with gear teeth 2. The gear teeth 2 may be formed either before or after the formation of the clutch face and after the clutch face is completed the teeth are ground, generated or otherwise brought to accurate form. The blank is formed with a cylindrical portion 3 and with an axial shaft opening 4, which is here shown, as square, although in some cases the portion 3 is omitted and the clutch face formed within the toothed portion.

The circular series of holes 5 are first drilled in the cylindrical portion 3, these series of holes being in a circle concentric with the axis of the blank 1. The holes are preferably all drilled in one operation in a multiple drill. Conical countersinks 6 are then formed with a suitable tool at the outer ends of the holes 5, some of these countersinks being shown in Fig. 1 and others for the purpose of illustration being omitted.

7 is the counterbore formed in one end of the blank concentric with the axis thereof, the counterbore intersecting the openings 5 in a circle located within and concentric with a circle passing through the centers of the openings 5 and with the axis of the blank 4, so that the sides of the holes 5, which open into the bore, are contracted, as shown at 8 in Fig. 3. The truing of the opposite side walls of each hole 5 in parallel relation to the axis of the blank or planes radial with such axis, that is, the truing of the walls of the holes adjacent the corners formed by said walls and the wall of the bore 7, is effected by properly positioning the end mill, so that it removes the portions 8 of such walls forming the contracted sides of the holes, the end mill removing simultaneously such portions 8 on opposite sides of each hole 6, and the radius of the end mill being substantially the same as that of a tooth of the male member of the clutch, so that the teeth of the male member accurately slidably fit the milled off faces of the holes 8. As in boring the holes 5, the drills, in following the path of least resistance " run off " differently, the amount of material milled off at 8 might be different in different holes or on opposite sides of the same hole, as illustrated at 9 in Figs. 4 and 5.

By this method, the precision operation of forming accurately the engaging surfaces of the clutch is performed in a simple and economical manner.

In Figs. 8 and 9, the male member of the clutch is shown as provided on a stem gear. In forming the male member of the clutch, the blank is turned to two diameters and a groove formed between the portions of the two diameters. The external teeth 11 of the clutch face and the teeth 12 of the gear are cut or formed in one operation, so that the teeth 11 of the clutch face are in line with the teeth 12 of the gear, the clutch teeth being formed on the portion of smaller diameter. The clutch teeth are then rounded by a suitable tool, so that such teeth fit the milled surfaces 9 of the female clutch member and then pointed at their ends to guide them into mesh with the female member.

As will be understood by those skilled in the art, in the high or direct speed clutch of transmission gearings, such as are used in motor vehicles, the clutch members must fit as tightly as possible and at the same time must be easily shiftable, one into engagement with the other. Any looseness produces a looseness in the driving of a car, the effect of which looseness in the clutch is greatly magnified and gives the impression to the driver or occupants of the car of a great deal more looseness or lost motion, than is actually present. In fact, the lost motion, on inspection, may be almost imperceptible but, nevertheless, in the operation of the car the looseness feels very great, particularly when the engine speed is accelerated or diminished, at which times the high speed clutch members effect a very perceptible and objectionable knock.

After the formation of gear teeth and the clutch face, the article is heat treated or carbonized and during such treatment there is more or less distortion and hence an accurate fitting of the clutch members must be made before the article is heat treated. If necessary, the milled surfaces are ground after the heat treatment sufficiently to correct any misalinement brought about by distortion during the heat treatment. However, generally speaking, grinding is necessary only in exceptional circumstances.

In use, the female clutch member is a sliding gear on the driven shaft or a transmission gearing and the male clutch member is on the driving shaft or stem gear of the transmission gearing, these driving and driven shafts being arranged in axial alinement and, in order to obtain direct drive or high speed between the driving and driven shafts, the gear is shifted axially into mesh with the clutch face of the stem gear.

What I claim is:

1. The method of forming an internal clutch face, comprising providing in a gear blank, a circular series of drilled holes in a circle concentric with the axis of the blank, and approximately parallel to the axis of the blank, counterboring the blank concentric with its axis, with the bore intersecting the circular series of holes, leaving the inner sides of the holes opening into the counterbore, truing, as accurately as possible into parallel relation with the axis of the blank, the side walls of the holes, adjacent the corners formed by said side walls and the wall of the bore.

2. The method of forming an internal clutch face comprising providing in a gear blank, a circular series of drilled holes in a circle concentric with the axis of the blank, and approximately parallel to the axis of the blank, counterboring the blank concentric with its axis, with the bore intersecting the circular series of holes in a circle located within and concentric with a circle intersecting the centers of said holes thereby leaving the inner sides of the holes opening into the counterbore, and truing, as accurately as possible into parellel relation with the axis of the blank, the side walls of the holes, adjacent the corners formed by said side walls and the walls of the bore.

3. The method of forming an internal clutch face comprising providing in a gear blank a circular series of drilled holes in a circle concentric with the axis of the blank, and approximately parallel to the axis of the blank, countersinking the outer ends of the holes, counterboring the blank concentric with the axis of the blank, with the bore intersecting the circular series of holes leaving the inner sides of the holes opening into the counterbore and truing, as accurately as possible, in parallelism with the axis of the blank, the side walls of the holes adjacent the corners formed by said walls and the wall of the bore.

In testimony whereof, I have hereunto signed my name, at Syracuse, in the county of Onondaga and State of New York, this 26th day of Feb. 1924.

HERBERT J. LEIGHTON.